J. TAYLOR.
SPEEDOMETER FOR MOTOR CYCLES.
APPLICATION FILED JUNE 6, 1913.
1,102,364.
Patented July 7, 1914.
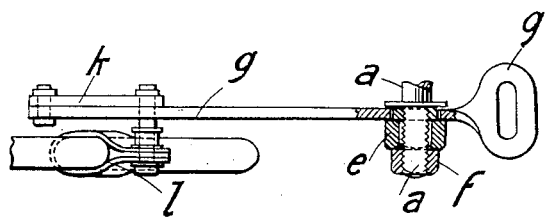
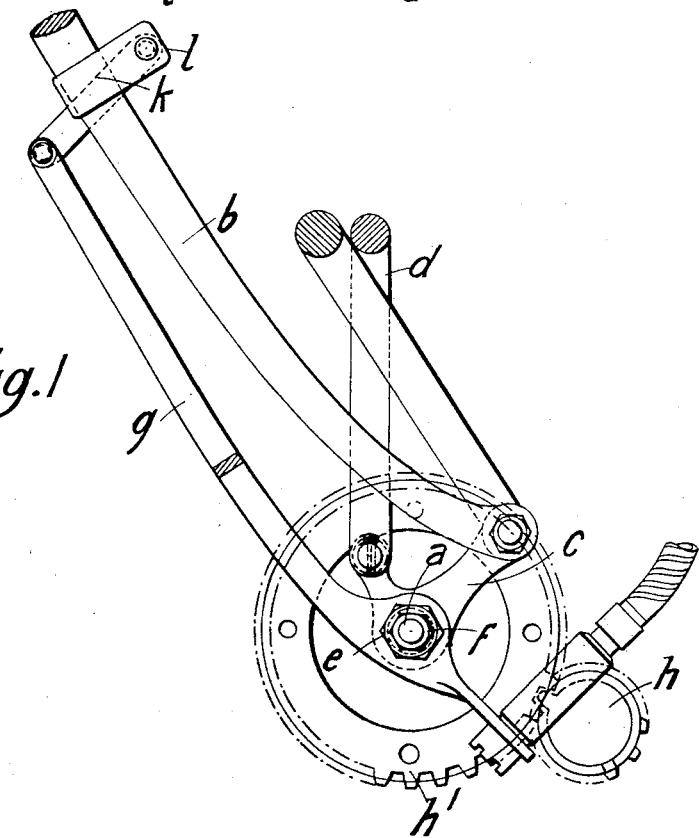

UNITED STATES PATENT OFFICE.

JOHN TAYLOR, OF STONEY STRATFORD, ENGLAND.

SPEEDOMETER FOR MOTOR-CYCLES.

1,102,364.  Specification of Letters Patent.  Patented July 7, 1914.

Application filed June 6, 1913.  Serial No. 772,032.

*To all whom it may concern:*

Be it known that I, JOHN TAYLOR, a subject of the King of England, residing at Wakefield Lodge, Stoney Stratford, in the county of Buckingham, England, have invented new and useful Improvements Relating to Speedometers for Motor-Cycles, of which the following is a specification.

Where a speedometer is geared through a flexible shaft to the front wheel of that class of motor cycle in which such wheel is coupled to the fork through spring levers or the like, it has been common practice heretofore to support the end of said flexible shaft, and the toothed wheel through which it is driven from a toothed wheel on the cycle wheel, in a bracket which is secured to the axle of said wheel. Consequently any movement of said front wheel axle relatively to the cycle frame tends to cause the bracket to oscillate around the axle and the index of the speedometer to vibrate apart from any variation of the speed of the cycle.

Now my invention has for its object an attachment designed to prevent such vibration comprising a lever of suitable size and shape adapted to carry the end of the flexible shaft on one end thereof and journaled near that end on a bush carried by the cycle front wheel axle or otherwise fulcrumed thereon. The opposite end of this lever has hinged to it one end of a short rod the other end of which is hinged to a bracket or the equivalent on the front fork of the cycle so that said lever cannot oscillate about the axle of the cycle wheel but is free to move with it.

An attachment constructed according to my invention is illustrated by the accompanying drawings, and I will further describe the same by the aid thereof.

Of these drawings Figure 1. is a side elevation of the front wheel axle and a portion of the front fork of a motor cycle with the attachment for supporting the speedometer driving gear applied thereto, and Fig. 2. is a plan thereof.

As illustrated the cycle frame is of the well known type wherein the front wheel axle $a$ is connected to each of the arms $b$ of the front fork through a short arm $c$ hinged or pivoted thereto, while it is connected to the head or other part of the frame through stays $d$ and a spring or springs not shown.

Journaled on a sleeve $e$, secured to one end of the axle $a$ by a nut $f$, is a lever $g$ the longer arm of which is connected through a short rod or link $k$ to a bracket or clip $l$ secured to the arm $b$ of the front fork of the cycle frame. The shorter arm of this lever has secured to it a casing in which is arranged the usual mechanism for gearing the flexible shaft of a speedometer to a spur wheel on the front wheel of the cycle. This may consist of two spindles journaled in said casing and geared together by worm gearing; one of said spindles being connected to the end of the flexible shaft of the speedometer, while the other carries a spur wheel $h$ gearing with the spur wheel $h^1$ on the cycle front wheel.

The length of the member $c$ is equal to that of the member $k$, and the distances between the points at which the members $b$ and $g$ are connected to the member $k$ and at which they are connected to the member $a$ and member $c$ respectively are equal. It will thus be seen that these members or the portions thereof referred to form in combination a parallel motion and the lever $g$ and with it the speedometer driving mechanism may thus move with the front wheel axle, but is prevented from oscillating around it and so causing the index of the speedometer to vibrate.

Having now particularly described and ascertained the nature of my said invention, and in what manner the same is to be performed, I declare that what I claim is:—

1. In motor cycles, in combination, a front fork, a front wheel axle, a yielding connection between said axle and said fork whereby said axle may move relatively to said fork, a lever pivotally mounted intermediate its ends to said axle, speedometer driving mechanism mounted upon one end of said lever, and a yielding connection between the other end of said lever and said fork, said two yielding connections forming in combination with portions of the lever and front fork a parallel motion.

2. In motor cycles, in combination, a front fork, a front wheel axle, a yielding connection between said axle and said fork whereby said axle may move relatively to said fork, a lever pivotally mounted intermediate its ends to said axle, speedometer driving mechanism mounted upon one end of said lever, and a yielding connection between the other end of said lever and said fork, said second mentioned yielding connection being of the same length as, and parallel to said first mentioned yielding connection, said two yielding connections forming in combination with portions of the lever and front fork a parallel motion.

In testimony whereof I have signed my name to this specification in the presence of two subscribing witnesses.

JOHN TAYLOR.

Witnesses:
CASTLE SMITH,
FREDERICK JAMES BINGHAM.